3,079,410
PROCESS FOR STABILIZING ANIONIC AND CATIONIC ESTER SALTS OF 21-HYDROXY-20-KETO-STEROIDS IN AN AQUEOUS SOLUTION
Werner Fritsch, Neuenhain, Taunus, Werner Haede, Hofheim, Taunus, Helmut Scherer, Bad Soden, Taunus, and Walter Kempe, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 28, 1961, Ser. No. 98,761
Claims priority, application Germany Apr. 2, 1960
3 Claims. (Cl. 260—397.45)

The present invention relates to a process for stabilizing anionic and cationic ester salts of 21-hydroxy-20-keto-steroids in an aqueous solution.

It is already known that 21-hydroxy-20-keto-steroids can be esterified with acids containing, in addition to the carboxyl group, another group capable of forming a salt. The salts thus formed, for example, of succinic acid esters and diethylaminoacetic acid esters, are distinguished by an increased solubility in water. Particularly the sodium salts of such steriod-succinic acid esters are clinically valuable anesthetic and hormone preparations. These esters, however, hydrolyze in an aqueous solution at room temperature already and, therefore, possess a limited stability only.

According to a known process, solutions of steroid-succinic acid semi-ester salts can be stabilized by adding ascorbic acid salts. The stabilizing effect of the ascorbates, however, is only very poor and only possible at very low steroid concentrations, i.e. at concentrations of 5 mg. of steroid per cc. At higher concentrations as mostly used in pharmaceutics, for example 5–50 mg. of steroid per cc., these ascorbates have a detrimental effect on the stability.

Now we have found a process for stabilizing anionic and cationic ester salts of 21-hydroxy-20-keto-steroids in an aqueous solution wherein at least one physiologically tolerable non-ionic organic hydrotropic solubilizer is added to the solutions of these salts at a pH value ranging from 5 to 8.

It was not obvious to find stabilizers which even at high steroid concentrations impart to the steroid solutions a stability 4 to 10 times as high as that of solutions which are not stabilized or stabilized with ascorbates. The solutions stabilized according to the invention stand for example a temperature of 100° C. for several hours.

Suitable physiologically tolerable stabilizers for the present purpose are, for example, alkylamides, alkylphenolformaldehyde-ethylene oxide condensates, lactic acid esters, polyglycols, polyoxyethylene-sorbitoleate, polyoxyethylene fatty acid ester, polyoxyethylene fatty acid glycerides, polyvinyl pyrrolidone, propylene glycol, pyrazole derivatives, sarcosine anhydride (N,N'-dimethyl-diketopiperazine), urethanes as well as dextrins, dextrans and water-soluble starch preparations. By means of these stabilizers there can be stabilized in aqueous solution anionic and cationic steroid ester salts such, for example, as steroid-malonates, steroid-succinates or substituted and unsubstituted amino acid esters of 21-hydroxy-20-keto-steroids such as pregnane-21-ol-3,20-dione, $\Delta^4$-pregnene-21-ol-3,20-dione, $\Delta^{1,4}$-pregnadiene-17,21-diol-3,20-dione, or their 11-hydroxy derivatives, 16-hydroxy derivatives, 11-keto-derivatives, 6$\alpha$-methyl derivatives, 16$\alpha$-methyl derivatives or 9-halogen derivatives, especially fluorine being used as halogen atom in position 9.

For the formation of salts with the aforementioned steroid esters, there may be used in the case of the anionic esters, in addition to the sodium cation, for example the other alkali metal cations or ammonia, alkylamines, hydroxyalkylamines and analogous diamines or polyamines such as hexamethylene tetramine. In the case of the cationic steroid esters, there may be used for the formation of salts for example hydrohalic acids such as hydrochloric acid, hydrobromic acid, sulfuric acid, phosphoric acid, low molecular aliphatic carboxylic acids, acylated amino acids, dicarboxylic acids or hydroxycarboxylic acids and hydroxydicarboxylic acids.

The following examples serve to illustrate the invention, but they are not intended to limit it thereto.

*Example 1*

2 g. of prednisolone-sodium succinate are dissolved in 40 cc. of water and the solution is adjusted to a pH value of 6.4, while stirring, under nitrogen and adding 20 mg. of prednisolone-hemisuccinate. After filtration, 10 g. of sarcosine anhydride are added to the solution which is then filtered again.

*Example 2*

1 g. of prednisolone-sodium-succinate is dissolved in 40 cc. of water and the solution is adjusted to a pH value of 6.4 by adding 10 mg. of prednisolone-hemisuccinate under nitrogen and while stirring. After filtration, 5 g. of ethylurethane are added to the solution and the solution is made up to 50 cc.

*Example 3*

A solution is prepared as described in Example 2 which solution, however contains 5 g. of 1-phenyl-2,3-dimethyl-pyrazolone-(5) instead of ethylurethane.

*Example 4*

A solution is prepared as described in Example 2 which solution, however, contains 5 g. of diethylacetamide instead of ethylurethane.

*Example 5*

A solution is prepared as described in Example 2 which solution, however, contains 5 g. of polyvinyl pyrrolidone instead of ethylurethane.

*Example 6*

A solution is prepared as described in Example 2 which solution, however, contains 2 g. of dextrin instead of ethylurethane.

*Example 7*

A solution is prepared as described in Example 2, which solution, however, contains 5 g. of 1,2-propylene-glycol instead of ethylurethane.

*Example 8*

A solution is prepared as described in Example 2, which solution, however, contains 5 g. of polyglycol-500 instead of ethylurethane.

*Example 9*

A solution is prepared as described in Example 2, which solution, however, contains 5 g. of lactic acid ethanolamide instead of ethylurethane.

*Example 10*

1 g. of prednisolone-hemisuccinate is first adjusted to a pH-value of 7 with a 2% aqueous triethanolamine solution, while stirring under nitrogen, and then adjusted to a pH value of 6.3 by further adding 10 mg. of prednisolone-hemisuccinate. After the addition of 5 g. of sarcosine anhydride, the solution is made up to 50 cc. and filtered.

*Example 11*

1 g. of prednisolone-hemisuccinate is first adjusted to a pH-value of 7 with a 2% solution of tetrahydroxyethyl-ethylenediamine, while stirring under nitrogen, and then adjusted to a pH value of 6.3 by further adding 10 mg.

of prednisolone-hemisuccinate. After the addition of 2.5 g. of sarcosine anhydride, the solution is made up to 50 cc. and filtered.

Example 12

1 g. of prednisolone-diethylaminoacetate-hydrochloride and 5 g. of sarcosine anhydride are dissolved in 50 cc. of water and filtered.

Example 13

1 g. of 6α-methylprednisolone-sodium-succinate and 10 g. of sarcosine anhydride are dissolved in 50 cc. of water and the solution is adjusted to a pH value of 6.4 while stirring under nitrogen and adding a very little quantity of ion exchanger "Lewatit S–100," H-form and filtered.

Example 14

1 g. of 6α-methylprednisolone-sodium-succinate, 5 g. of sarcosine anhydride and 2 g. of dextrin are dissolved in 50 cc. of water and the solution is adjusted to a pH value of 6.4, by adding a very little quantity of ion exchanger "Lewatit S–100" H-form while stirring under nitrogen, and filtered.

Example 15

1 g. of 6α-methylprednisolone-sodium-succinate, 20 g. of sarcosine anhydride and 2.5 g. of oxyethylated castor oil are dissolved in 50 cc. of water and the solution is adjusted to a pH of 6 by adding ion exchanger "Lewatit S–100," H-form while stirring under nitrogen and filtered.

Example 16

A solution is prepared as described in Example 15 which solution, however, contains 2.5 g. of tertiary-octylphenolformaldehyde-ethylene oxide condensate instead of oxyethylated castor oil.

Example 17

1 g. of 6α-methylprednisolone-diethylaminoacetate-hydrochloride and 5 g. of sarcosine anhydride are dissolved in 50 cc. of water.

Example 18

1 g. of 6α-methylprednisolone-sodium-succinate, 7.5 g. of sarcosine anhydride and 3.75 g. of tertiary-octylphenolformaldehyde-ethylene oxide condensate are dissolved in 50 cc. of water and the solution is adjusted to a pH value of 6.4 by adding ion exchanger "Lewatit S–100," H-form, while stirring under nitrogen, and filtered.

Example 19

A solution is prepared as described in Example 18 which solution contains 1.5 g. of polyoxyethylene stearate ("Myrj 53") instead of tertiary-octylphenolformaldehyde-ethylene oxide condensate.

Example 20

A solution is prepared as described in Example 18 which solution contains 1.5 g. of polyoxy-ethylene-sorbitane-oleate ("Tween 80") instead of tertiary-octylphenolformaldehyde-ethylene oxide condensate.

Example 21

A solution is prepared as described in Example 18 which solution contains 1.5 g. of polyglycol 4000 (polyethylene glycol) instead of tertiary-octylphenolformaldehyde-ethylene oxide condensate.

Example 22

A solution is prepared as described in Example 18 which solution contains 5.0 g. of polyglycol 4000 instead of tertiary-octylphenolformaldehyde-ethylene oxide condensate.

Example 23

A solution is prepared as described in Example 18 which solution contains 5.0 g. of polyvinyl pyrrolidone instead of tertiary-octylphenolformaldehyde-ethylene oxide condensate.

We claim:

1. A composition of matter comprising an organic ester salt selected from the group consisting of 21-hydroxy-20-keto $\Delta^4$ and $\Delta^{1,4}$ steroids of the pregnene series in an aqueous solution and at least one physiologically tolerable non-ionic organic hydrotropic solubilizer as a stabilizer for said solution at a pH ranging from 5 to 8.

2. A composition of matter as claimed in claim 1 wherein the stabilizer is a member of the group consisting of sarcosine anhydride, ethyl urethane, diethyl acetamide, oxethylated castor oil, tertiary octylphenol-formaldehyde-ethylene oxide condensate, polyoxyethylene sorbitane oleate and polyethylene glycol.

3. A process for stabilizing an anionic and cationic organic ester salt selected from the group consisting of 21-hydroxy-20-keto $\Delta^4$ and $\Delta^{1,4}$ steroids of the pregnene series in an aqueous solution which comprises adding at least one physiologically tolerable non-ionic organic hydrotropic solubilizer to the aqueous solution thereof at a pH value ranging from 5 to 8.

References Cited in the file of this patent

UNITED STATES PATENTS 2,970,944   Charnicki et al. _____ Feb. 7, 1961